United States Patent
Lee et al.

(10) Patent No.: US 10,737,409 B2
(45) Date of Patent: Aug. 11, 2020

(54) APPARATUS AND METHOD OF CONTROLLING STIFFNESS OF SOFT MATERIAL

(71) Applicant: INDUSTRY-ACADEMIC COOPERATION FOUNDATION, YONSEI UNIVERSITY, Seoul (KR)

(72) Inventors: Hyungsuk Lee, Seoul (KR); Byungjun Kang, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 546 days.

(21) Appl. No.: 15/441,880

(22) Filed: Feb. 24, 2017

(65) Prior Publication Data

US 2017/0246768 A1    Aug. 31, 2017

(30) Foreign Application Priority Data

Feb. 25, 2016 (KR) .................. 10-2016-0022718
Feb. 25, 2016 (KR) .................. 10-2016-0022730

(51) Int. Cl.
    *B29C 35/02*     (2006.01)
    *B29K 105/00*     (2006.01)
    *B29K 105/16*     (2006.01)

(52) U.S. Cl.
CPC .. *B29C 35/0261* (2013.01); *B29K 2105/0061* (2013.01); *B29K 2105/16* (2013.01); *B29K 2883/00* (2013.01); *B29K 2995/007* (2013.01)

(58) Field of Classification Search
CPC ................................................. B29C 35/0261
See application file for complete search history.

(56) References Cited

U.S. PATENT DOCUMENTS

| | | | |
|---|---|---|---|
| 3,180,630 A * | 4/1965 | Endres | B29B 13/022 |
| | | | 126/343.5 A |
| 2012/0070427 A1 | 3/2012 | Kaplan et al. | |
| 2013/0192958 A1* | 8/2013 | Ding | B07C 5/3427 |
| | | | 198/617 |
| 2015/0165091 A1 | 6/2015 | Dalecki et al. | |

FOREIGN PATENT DOCUMENTS

| | | |
|---|---|---|
| JP | 2012130920 | 7/2012 |
| JP | 2015512766 | 4/2015 |
| KR | 100700324 | 3/2007 |

* cited by examiner

*Primary Examiner* — Larry W Thrower
(74) *Attorney, Agent, or Firm* — Hauptman Ham, LLP

(57) ABSTRACT

Provided are an apparatus and a method of controlling a stiffness of a soft material hardened from a liquid state having viscosity into a solid state. The apparatus of controlling a stiffness of a soft material includes: a soft material accommodating means including a chamber corresponding to a space in which the soft material having fluidity before being hardened is accommodated and a wall structure surrounding the chamber; and a stimulus means applying a stimulus to the soft material to generate a flow in the soft material, wherein a flow is applied to the soft material to control the stiffness in the soft material and control stiffnesses to be different from each other in each region of the soft material.

8 Claims, 10 Drawing Sheets

FIG. 3A    FIG. 3B    FIG. 3C
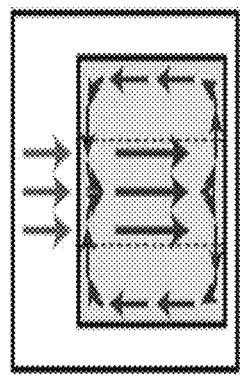 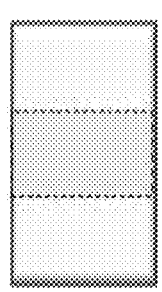 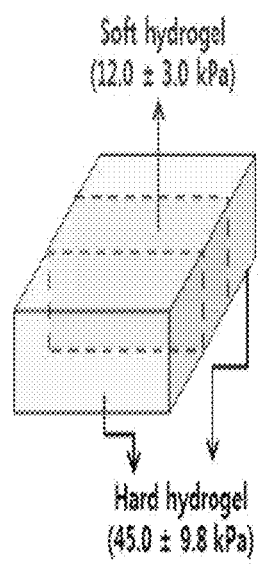
FIG. 4
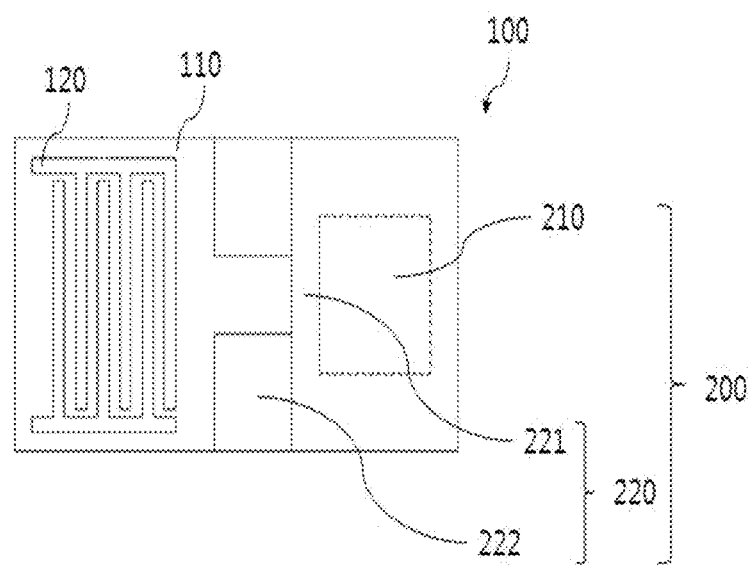

APPARATUS AND METHOD OF CONTROLLING STIFFNESS OF SOFT MATERIAL

CROSS-REFERENCE TO RELATED APPLICATIONS

This application claims priority under 35 U.S.C. § 119 to Korean Patent Application No. 10-2016-0022718 and 10-2016-0022730, filed on Feb. 25, 2016, in the Korean Intellectual Property Office, the disclosure of which is incorporated herein by reference in its entirety.

TECHNICAL FIELD

The following disclosure relates to an apparatus and a method of controlling a stiffness of a soft material and furthermore cell or micro particle patterning using surface acoustic waves. More particularly, the following disclosure relates to an apparatus of controlling a stiffness of a soft material capable of allowing a mechanical strength in a soft material corresponding to a material hardened from a liquid state having viscosity into a solid state, such as a synthetic hydrogel, a natural hydrogel, or a polymer to have anisotropic characteristics by allowing the soft material to have stiffnesses different from each other depending on regions, and a method of controlling a stiffness of a soft material using the same.

BACKGROUND

A synthetic hydrogel, a natural hydrogel, or a polymer is a soft material hardened from a liquid state having viscosity into a solid state.

Particularly, a hydrogel among soft materials means a porous material formed of a water-soluble polymer material. The porous material, which is a material having a porous structure, has characteristics that properties such as mechanical strength, permeability, electro-conductivity, and the like, are changed depending on factors such as porosity, sizes of pores, a distribution of the pores, shapes of the pores, and the like. The porous material has been variously used as materials of filters, electrodes, gas sensors, gas separators, scaffolds in the case of transplanting a biological tissue, wet dressing, mask packs, and the like, using these characteristics.

In the hydrogel, which is a kind of polymer, monomers and cross-linkers are combined with each other to form pore structures capable of holding water therein. Since the hydrogel has excellent hydrophilicity and biocompatibility, many studies on the hydrogel for medical applications have been conducted. For example, since the hydrogel holds water therein, the hydrogel may provide an advantageous environment to cells, drugs, or the like, is appropriate for carrying nutrients required for cultivation of cells, is easily deformed by a cell adhesion ligand, and does not have biological toxicity, such that the hydrogel is used as a material of a tissue engineering scaffold, a drug delivery system, a patch for wound healing, or the like, and recently, studies on applications of a structure of a soft robotics and a microfluidic actuator have been actively conducted.

However, the hydrogel has a disadvantage such as weak mechanical strength, such that there is a limitation in using the hydrogel in an actual application. Therefore, many studies for improving a mechanical property, or the like, of the hydrogel by applying a specific stimulus to the hydrogel have been conducted. Particularly, the hydrogel has been used to culture stem cells, and it has been known that a stiffness of the hydrogel has an influence on differentiation of the stem cells. That is, even though stem cells are the same each other, cells formed by differentiating the stem cells become different from each other depending on a stiffness of the hydrogel used to culture the stem cells (see FIG. 1). Therefore, it acts as a very important element in determining an application range of the hydrogel to control a mechanical strength of the hydrogel.

As an attempt to control a mechanical property of the hydrogel, there is a method of improving ductility and toughness in a specific direction using a double-network hydrogel. However, in a process of manufacturing the double-network hydrogel, several complicated steps should be performed, and there is a limitation in a material that may be used to form a primary structure network. As another method, there is a directional freezing-thawing method. However, this method has a limitation in a forming temperature, and the possibility that damage will be generated in a material in a freezing-thawing process is high, such that this method is not appropriate for being used for a biological material. Recently, a study for controlling a mechanical property of the hydrogel by adding an ultrasonic wave to the hydrogel has been conducted (see FIG. 2). However, this study does not also provide a method capable of controlling stiffnesses of each region in the hydrogel, such that it is not appropriate for being used to manufacture the hydrogel.

RELATED ART DOCUMENT

[Patent Document]
U.S. Patent Application Publication No. 2015/0165091 (published on Jun. 18, 2015)
U.S. Patent Application Publication No. 2012/0070427 (published on Mar. 22, 2012)

SUMMARY

An embodiment of the present invention is directed to providing an apparatus and a method of controlling a stiffness of a soft material by applying a flow to the soft material and an apparatus and a method of differently controlling stiffnesses in each region of the soft material.

In one general aspect, an apparatus of controlling a stiffness of a soft material hardened from a liquid state having viscosity into a solid state includes: a soft material accommodating means including a chamber corresponding to a space in which the soft material having fluidity before being hardened is accommodated and a wall structure surrounding the chamber; and a stimulus means applying a stimulus to the soft material to generate a flow in the soft material.

The wall structure may include a passing region through which the stimulus generated in the stimulus means passes and a blocking region through which the stimulus generated in the stimulus means is blocked.

The apparatus of controlling a stiffness of a soft material may further include a coupling member interposed between the soft material accommodating means and the stimulus means, wherein a passing region to which the stimulus generated in the stimulus means is transferred and a blocking region to which the stimulus generated in the stimulus means is blocked are formed in the chamber, the passing region being a region that corresponds to the coupling member and the blocking region being a region that does not correspond to the coupling member.

The stimulus means may be a surface acoustic wave generating means or an ultrasound transducer.

The stimulus means may be a surface acoustic wave generating means including a substrate and an inter digital transducer (IDT) electrode formed on the substrate.

A thickness of the wall structure in the passing region may be relatively smaller than that of the wall structure in the blocking region.

The wall structure of the soft material accommodating means may be formed of polydimethylsiloxane (PDMS).

The soft material accommodating means may be attached to the substrate.

In the case in which micro particles or cells are mixed with the soft material, the number of micro particles or cells per unit volume of the soft material may be changed and distributed depending on the flow, and differentiation levels of the cells may be changed depending on a stiffness of the surrounding soft material.

The soft material may be any one selected from the group consisting of a synthetic hydrogel, a natural hydrogel, and a polymer, and may be a material hardened from a liquid state having viscosity into a solid state.

In another general aspect, a method of controlling a stiffness of a soft material using the apparatus of controlling a stiffness of a soft material described above includes: accommodating the soft material having fluidity before being hardened in the soft material accommodating means; and applying a surface acoustic wave stimulus to the soft material to change an internal structure of the soft material, thereby controlling the stiffness of the soft material.

The method of controlling a stiffness of a soft material may further include: interposing a coupling member between the soft material accommodating means and the stimulus means; and forming a passing region to which the stimulus generated in the stimulus means is transferred and a blocking region to which the stimulus generated in the stimulus means is blocked in the chamber, the passing region being a region that corresponds to the coupling member and the blocking region being a region that does not correspond to the coupling member.

In still another general aspect, a method of controlling a stiffness of a soft material using the apparatus of controlling a stiffness of a soft material described above includes: controlling a thickness of the wall structure of the soft material accommodating means to set the passing region through which the stimulus passes and the blocking region through which the stimulus is blocked; injecting the soft material into the chamber of the soft material accommodating means; and applying the stimulus to the soft material through the stimulus means.

BRIEF DESCRIPTION OF THE DRAWINGS

FIGS. 3A to 3C illustrate a hydrogel.

FIG. 4 is a plan view illustrating an apparatus of controlling a stiffness of a soft material according to an exemplary embodiment of the present invention.

DETAILED DESCRIPTION OF MAIN ELEMENTS

Figure 1:
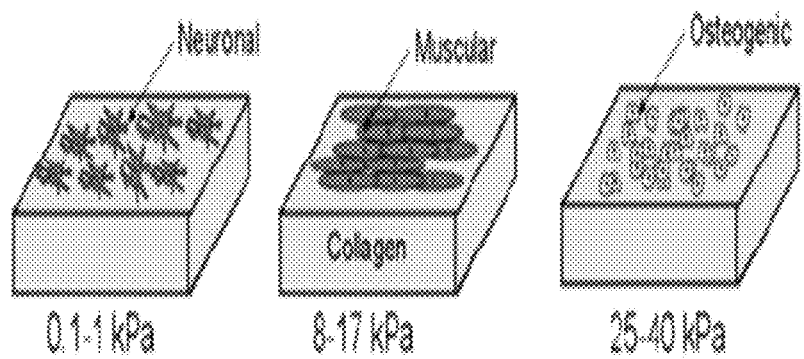
FIG. 1 illustrates an influence of a stiffness of a hydrogel on differentiation of stem cells.
Figure 2:
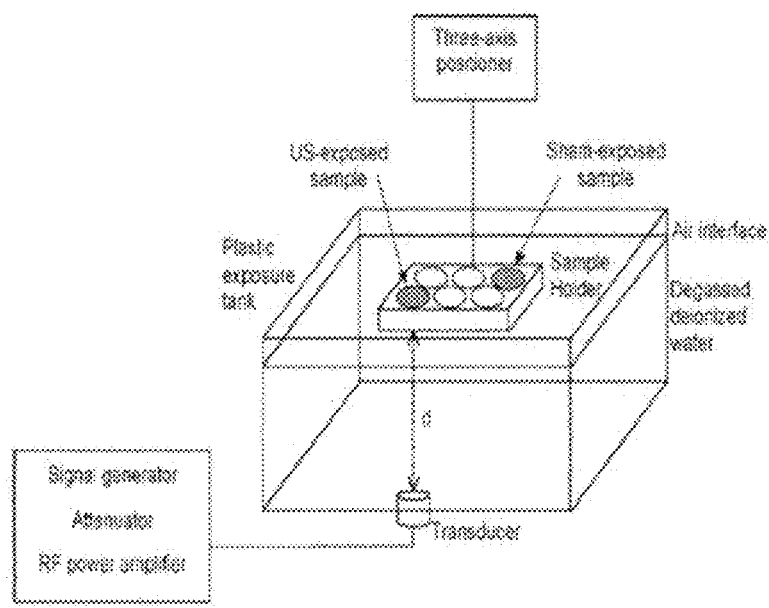
FIG. 2 illustrates a technology of changing a stiffness of hydrogel by an ultrasonic wave according to the related art.

| | |
|---|---|
| 100: apparatus of controlling stiffness of soft material | |
| 110: substrate | |
| 120: IDT electrode | 200: hydrogel accommodating structure |
| 210: chamber | 220: wall structure |
| 221, 410: passing region | 222, 420: blocking region |
| 300: cover | 310: first cover |
| 320: second cover | 400: hydrogel |
| 500: coupling member | |

Detailed Description of Embodiments

The present invention relates to an apparatus of controlling a stiffness of a soft material capable of allowing a mechanical strength in a soft material corresponding to a material hardened from a liquid state having viscosity into a solid state, such as a synthetic hydrogel, a natural hydrogel, or a polymer to have anisotropic characteristics by allowing the soft material to have stiffnesses different from each other depending on regions, and a method of controlling a stiffness of a soft material using the same.

Here, the soft material means a material hardened from a liquid state having viscosity into a solid state, such as a polymer such as a silicon rubber or polydimethylsiloxane (PDMS) as well as the synthetic hydrogel or the natural hydrogel, and the apparatus and the method of controlling a stiffness of a soft material according to the present invention will be applied to the soft material as described above.

However, hereinafter, a general hydrogel will be described as an example of the soft material for convenience of explanation.

FIGS. 3A to 3C illustrate a basic principle of a technology of controlling a stiffness of a hydrogel according to an exemplary embodiment of the present invention. When a flow is applied to an inner portion of a hydrogel solution during a period in which a hydrogel gelates, the hydrogel has an anisotropic structure by a flow direction and a flow velocity.

As illustrated in FIG. 3A, when a stimulus is applied to a portion of the hydrogel, a flow is generated in the hydrogel, and the flow in the hydrogel changes an internal structure of the hydrogel. In an exemplary embodiment according to FIG. 3A, when a stimulus is applied to a central portion of the hydrogel, an initial flow is generated in a direction in which the stimulus is applied, and the initial flow generates a flow in a circulating form in the hydrogel.

It might be confirmed from a study result that a stiffness of the hydrogel becomes low as a flow velocity becomes high in a process in which the hydrogel gelates. That is, it might be appreciated that when a position and a form of the stimulus applied to the hydrogel are controlled, the flow in the hydrogel may be controlled, and when the flow in the hydrogel is controlled, a stiffness of the hydrogel may be partially controlled.

When the stimulus is applied to the central portion of the hydrogel as illustrated in FIG. 3A, a flow velocity in the central portion of the hydrogel is fastest, such that the hydrogel of which the central portion has a relatively low stiffness to have a soft property and side portions have a relatively high stiffness to have a hard property, as illustrated in FIGS. 3B and 3C, may be obtained.

In order to generate the flow in the hydrogel, an external stimulus should be applied to the hydrogel, and the external stimulus may be obtained through a surface acoustic wave or an ultrasound transducer. Since a method of using a surface acoustic wave (SAW) is most appropriate for precisely controlling the stiffness of the hydrogel depending on portions, the method of using a surface acoustic wave will hereinafter be mainly described.

Figure 5:
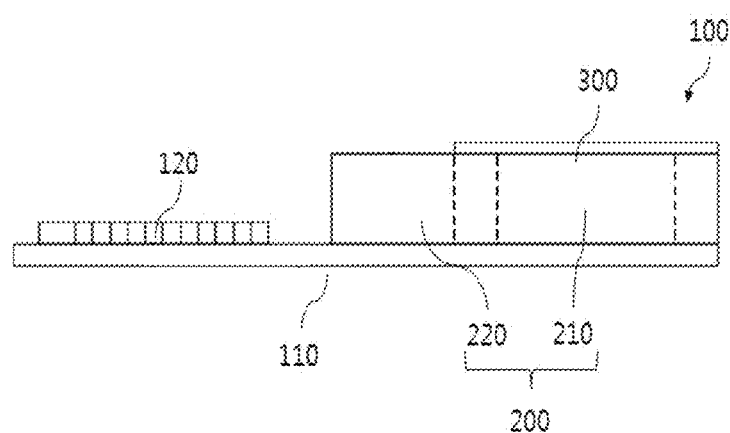
FIG. 5 is a front view illustrating the apparatus of controlling a stiffness of a soft material according to an exemplary embodiment of the present invention.
Figure 6:
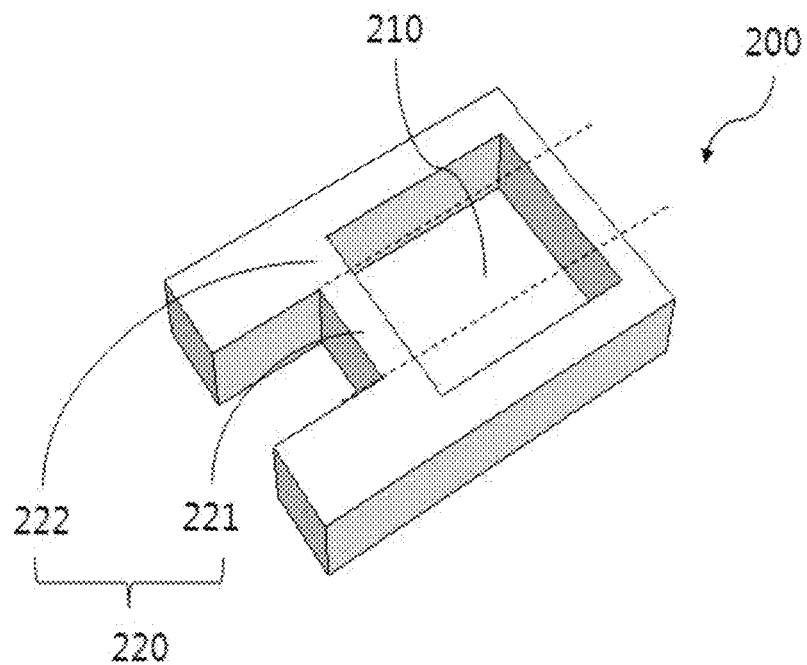
FIG. 6 is a perspective view illustrating a wall structure according to the present invention.

FIGS. 4 to 6 are, respectively, a plan view, a front view, and a side view illustrating an apparatus 100 of controlling a stiffness of a soft material according to an exemplary embodiment of the present invention. The apparatus 100 of controlling a stiffness of a soft material according to an exemplary embodiment of the present invention is configured to include a substrate 110, a hydrogel accommodating structure 200 formed on the substrate 110, a cover 300 blocking and sealing a hydrogel in the hydrogel accommodating structure 200 from the outside, and an inter digital transducer (IDT) electrode 120, which is a surface acoustic wave generating means.

The substrate 110 may be mainly formed of lithium niobate ($LiNbO_3$), quartz, lithium tantalite ($LiTaO_3$), or the like, but a material of the substrate 110 is not particularly limited as long as it may generate a surface acoustic wave.

The hydrogel accommodating structure 200 capable of accommodating the hydrogel therein is formed on the substrate 110. The hydrogel accommodating structure 200 includes a chamber 210 providing a space in which the hydrogel is accommodated and wall structures 220 surrounding the chamber 210. The wall structures 220 surround the chamber 210, and a wall structure 220 formed adjacently to the IDT electrode 120, of the wall structures 220 has a passing region 221 of which a thickness is relatively small and a blocking region 222 of which a thickness is relatively large.

The wall structures 220 are mainly formed of polydimethylsiloxane (PDMS). However, a material of the wall structure 220 is not particularly limited as long as it may store a fluid therein.

Figure 8:
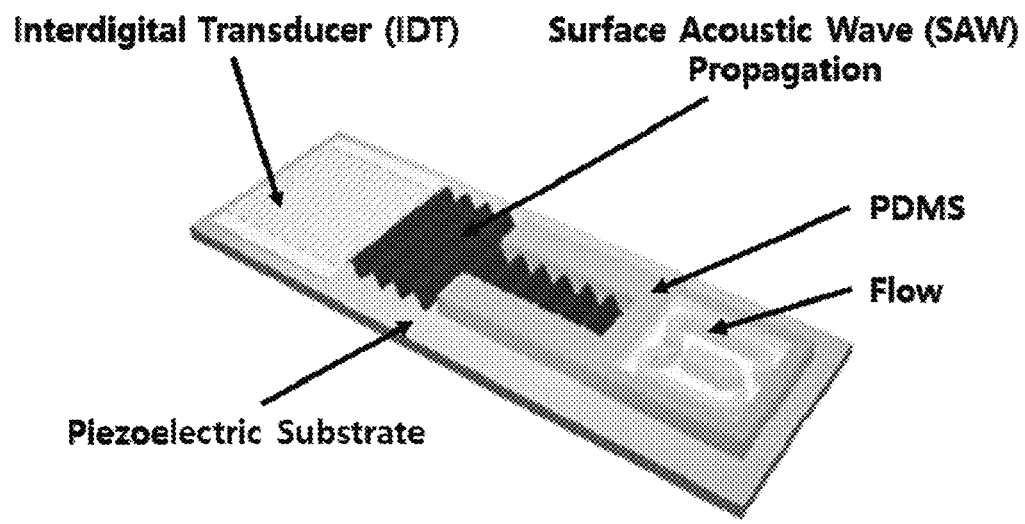
FIG. 8 is a conceptual diagram illustrating a process in which a surface acoustic wave generated from the IDT electrode is transferred to a hydrogel in the apparatus of controlling a stiffness of a soft material according to an exemplary embodiment of the present invention.

A thickness of the wall structure formed between the hydrogel accommodated in the chamber 210 and the IDT electrode 120 has a large influence on a level in which a surface acoustic wave generated by the IDT electrode 120 is transferred to the hydrogel. That is, it may be appreciated from the wall structure 220 illustrated in FIGS. 4 and 6 that a central portion of the chamber 210 is put in the passing region 221 of the wall structure of which the thickness is relatively small and both ends of the chamber 210 are put in the blocking region 222 of the wall structure of which the thickness is relatively large. When the IDT electrode 120 generates the surface acoustic wave in this state, most of the surface acoustic wave moving to the passing region 221 is transferred to the hydrogel accommodated in the chamber 210, but most of energy of the surface acoustic wave moving to the blocking region 222 is absorbed by the wall structure, such that most of the surface acoustic wave is not transferred to the hydrogel accommodated in the chamber 210. A transfer mechanism of the surface acoustic wave described above is illustrated in FIG. 8.

Although sizes and shapes of the passing region 221 and the blocking region 222 are determined in order to generate a flow in the central portion of the hydrogel accommodated in the chamber 210 in an exemplary embodiment illustrated in FIGS. 4 to 6, it may be obviously understood by those skilled in the art that positions and ratios of the passing region 221 and the blocking region 222 may be controlled in order to control a portion of the hydrogel to which a stimulus is applied. That is, according to the present invention, a flow form in the hydrogel may be freely controlled depending on a disposition scheme of the wall structure.

As described above, the surface acoustic wave is generated by the IDT electrode 120. The IDT electrode 120 is formed by attaching a piezoelectric material to a applied to the IDT electrode 120, the surface acoustic wave is generated on the substrate 110.

Figure 7:
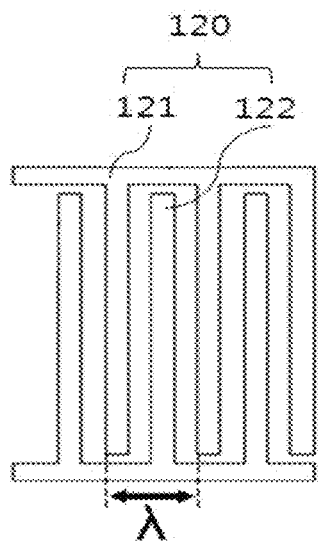
FIG. 7 illustrates an inter digital transducer (IDT) electrode according to an exemplary embodiment of the present invention.

In FIG. 7 illustrating a basic structure of the IDT electrode 120, an upper electrode 121 and a lower electrode 122 include a plurality of fingers, respectively, and the fingers are disposed in a form in which they are staggered. A wavelength or a frequency of the generated surface acoustic wave may be controlled by controlling a width of the electrode fingers and an interval between adjacent electrode fingers (the width of the electrode fingers and the interval between the electrode fingers are determined to be ¼ of the wavelength ($\lambda/4$)).

A method of controlling a stiffness of a soft material using the apparatus of controlling a stiffness of a soft material according to an exemplary embodiment of the present invention will be described with reference to FIG. 9. First, the thickness of the wall structure 220 of the hydrogel accommodating structure 200 should be controlled (S100). In this process, which is a process of determining positions and ratios of the passing region 221 and the blocking region 222, the positions and the ratios of the passing region 221 and the blocking region 222 may be determined depending on to which portion of the hydrogel the stimulus is applied.

When a structure of the hydrogel accommodating structure 200 is determined, the hydrogel accommodating structure 200 is attached to the substrate 110 (S200), a hydrogel material is injected into the chamber 210 of the hydrogel accommodating structure 200 (S300), and the cover 300 is attached to the chamber 210 so that the chamber 210 may be sealed (S400).

In addition, when AC power is applied to the IDT electrode 120 (S500), the surface acoustic wave is generated through the substrate 110. The surface acoustic wave is transferred to the hydrogel and mechanically stimulates the hydrogel to generate a flow in the hydrogel (S600), and when the flow of the hydrogel is continued for a predetermined time, anisotropic hydrogel of which a stiffness is partially changed depending on a flow level is completed (S700).

Hereinabove, the passing region 221 and the blocking region 222 are set by controlling a shape of the wall structure 220 of the hydrogel accommodating structure 200 in order to control a portion of the hydrogel to which the stimulus is applied, but the apparatus of controlling a stiffness of a soft material according to the present invention is not limited thereto.

In an apparatus of controlling a stiffness of a soft material according to another exemplary embodiment of the present invention, instead of controlling the shape of the wall structure 220 of the hydrogel accommodating structure 200 in order to control a portion of a hydrogel 400 to which the stimulus is applied, a coupling member 500 is interposed between the hydrogel accommodating structure 200 and the substrate to set a passing region 410 and a blocking region 420, thereby making it possible to control the portion of the hydrogel 400 to which the stimulus is applied.

Figure 10:
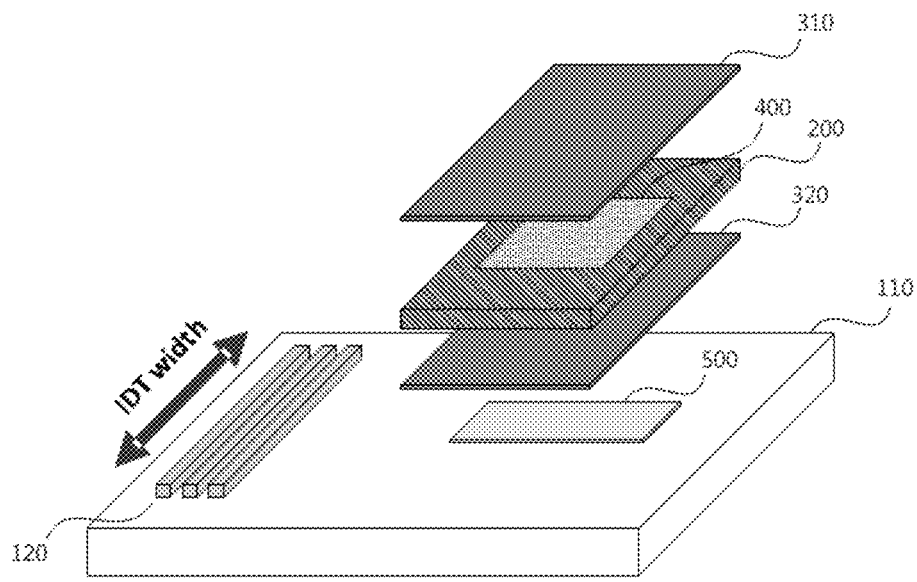
FIG. 10 is an exploded view and a perspective view of an apparatus of controlling a stiffness of a soft material according to another exemplary embodiment of the present invention.
Figure 10:
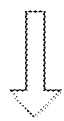
Figure 10:
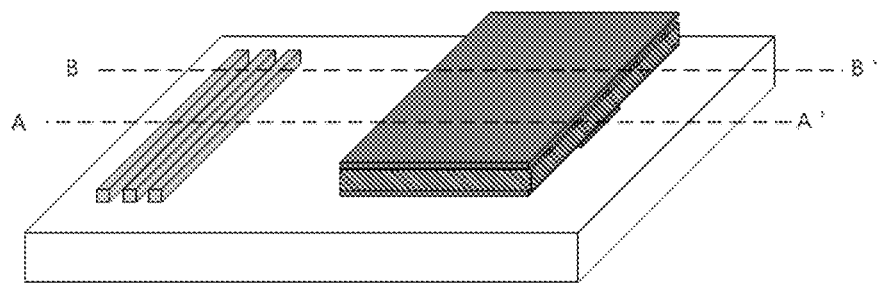

FIG. 10 is an exploded view and a perspective view of an apparatus of controlling a stiffness of a soft material according to another exemplary embodiment of the present invention.

According to FIG. 10, the apparatus of controlling a stiffness of a soft material according to another exemplary embodiment of the present invention is configured by sequentially stacking a coupling member 500, a second cover 320, a hydrogel accommodating structure 200, and a first cover 310 on a substrate.

A process of separating the hydrogel 400 from the substrate after the hydrogel 400 of which a stiffness is controlled is completed is easier in the case in which the portion of the hydrogel 400 to which the stimulus is transferred is controlled by interposing the coupling member 500 between the hydrogel accommodating structure 200 and the substrate as described above than in the case in which the hydrogel accommodating structure 200 is directly attached to the substrate as in an exemplary embodiment of the present invention.

Figure 11A:
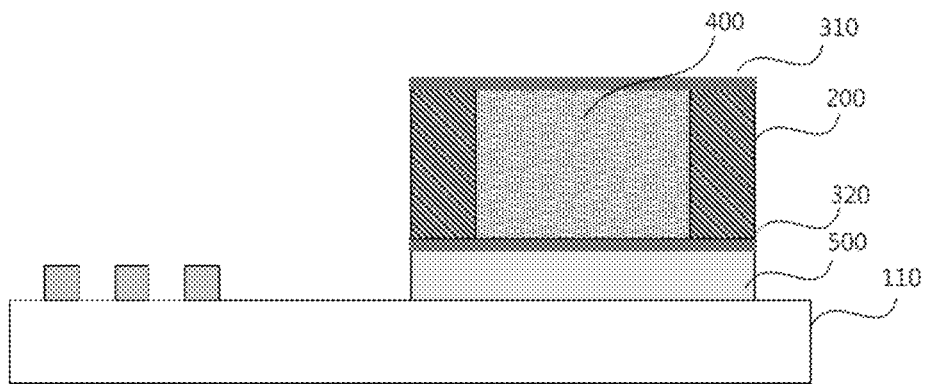
FIGS. 11A and 11B are, respectively, cross-sectional views taken along line A-A' and line B-B' of the apparatus of controlling a stiffness of a soft material illustrated in FIG. 10.
Figure 11B:
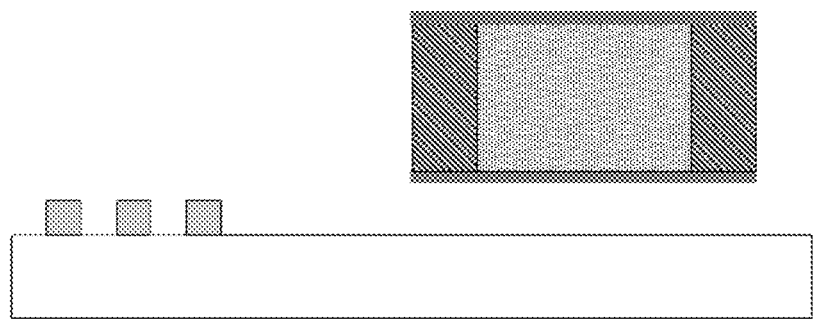
Figure 11C:
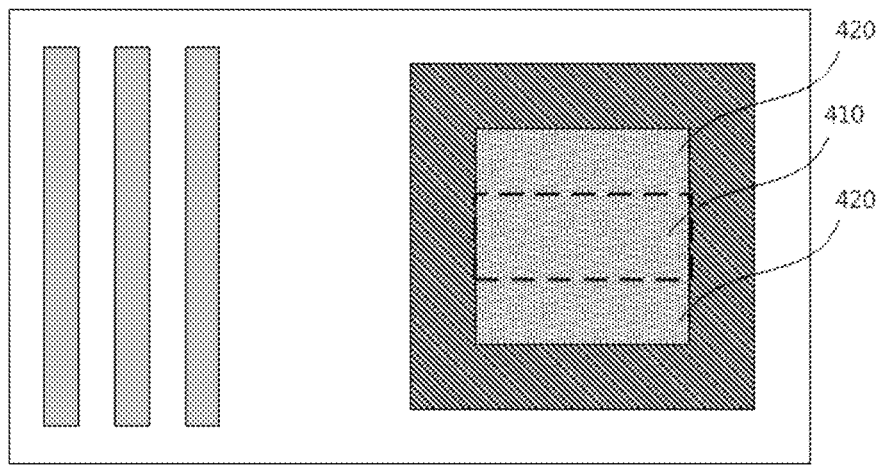
FIG. 11C is a plan view illustrating the apparatus of controlling a stiffness of a soft material illustrated in FIG. 10.

FIGS. 11A and 11B are, respectively, cross-sectional views taken along line A-A' and line B-B' of the apparatus of controlling a stiffness of a soft material according to another exemplary embodiment of the present invention illustrated in FIG. 10, and FIG. 11C is a plan view illustrating the apparatus of controlling a stiffness of a soft material illustrated in FIG. 10.

In the case in which a width of the coupling member 500 is smaller than that of the chamber 210, the stimulus is transferred to only a partial region of the hydrogel 400 accommodated in the chamber 210 through the coupling member 500, and is not transferred to the other regions, as illustrated in FIGS. 11A and 11B. Therefore, in this case, a main flow is generated in the passing region 410 (a broken line region of FIG. 11C) of the hydrogel 400 to which the stimulus is transferred, and a back flow due to reflection and circulation of the main flow is generated in the blocking region 420 of the hydrogel 400 to which the stimulus is not transferred.

Here, since a flow velocity of the main flow is faster than that of the back flow, the passing region 410 of the hydrogel 400 has a relatively low stiffness to have a soft property, and the blocking region 420 of the hydrogel 400 has a relatively high stiffness to have a hard property. In addition, a vortex is formed between the main flow and the back flow, and many microgel particles are conglomerated in a vortex region, such that a stiffness is highest in the vortex region than the other regions. Therefore, stiffnesses are high in a sequence of the vortex region, a back flow region, and a main flow region.

Figure 12A:
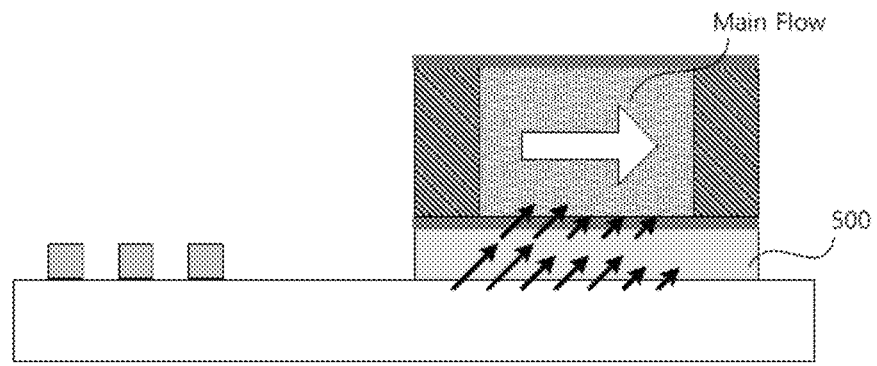
FIGS. 12A to 12C are conceptual diagrams illustrating flows of a hydrogel depending on a stimulus with respect to each of a passing region and a blocking region of a chamber in the apparatus of controlling a stiffness of a soft material illustrated in FIG. 10.
Figure 12B:
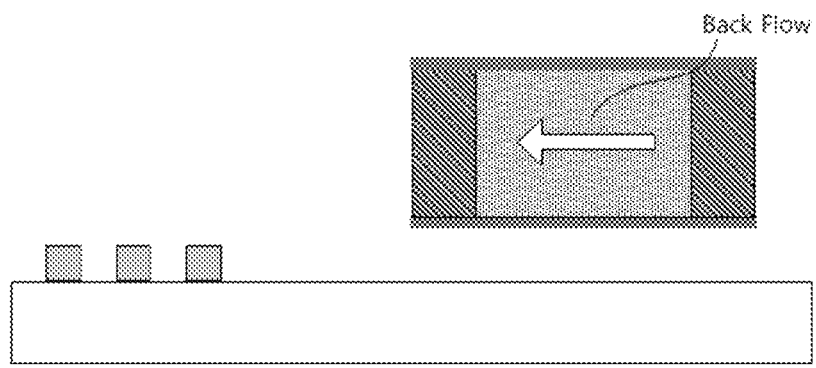
Figure 12C:
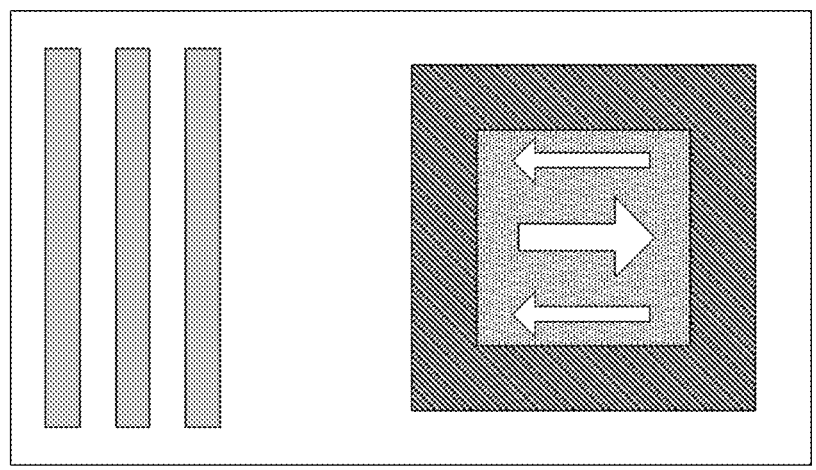

In order to assist in the understanding, a phenomenon that the main flow is generated in the hydrogel 400 by the stimulus transferred to the passing region 410 through the coupling member 500 and a reflection flow is generated in the blocking region 420 is illustrated in FIGS. 12A to 12C.

Hereinabove, a case in which in the apparatus of controlling a stiffness of a soft material according to another exemplary embodiment of the present invention, the coupling member 500 is interposed between the hydrogel accommodating structure 200 and the substrate to set the passing region 410 and the blocking region 420, thereby controlling the portion of the hydrogel 400 to which the stimulus is applied has been described.

However, although not illustrated in the drawings, an exemplary embodiment and another exemplary embodiment of the present invention are combined with each other, such that the surface acoustic wave is transferred to the hydrogel accommodating structure 200 through the coupling member 500 and thicknesses, positions, ratios, and the like, of the wall structures 220 of the hydrogel accommodating structure 200 are controlled, thereby making it possible to variously set the passing regions 221 and 410 and the blocking regions 222 and 420. In addition, a thickness of the bottom of the chamber 210 is changed or a groove is formed in the bottom of the chamber 210, thereby making it possible to variously control the stiffnesses of the hydrogel 400.

Figure 9:
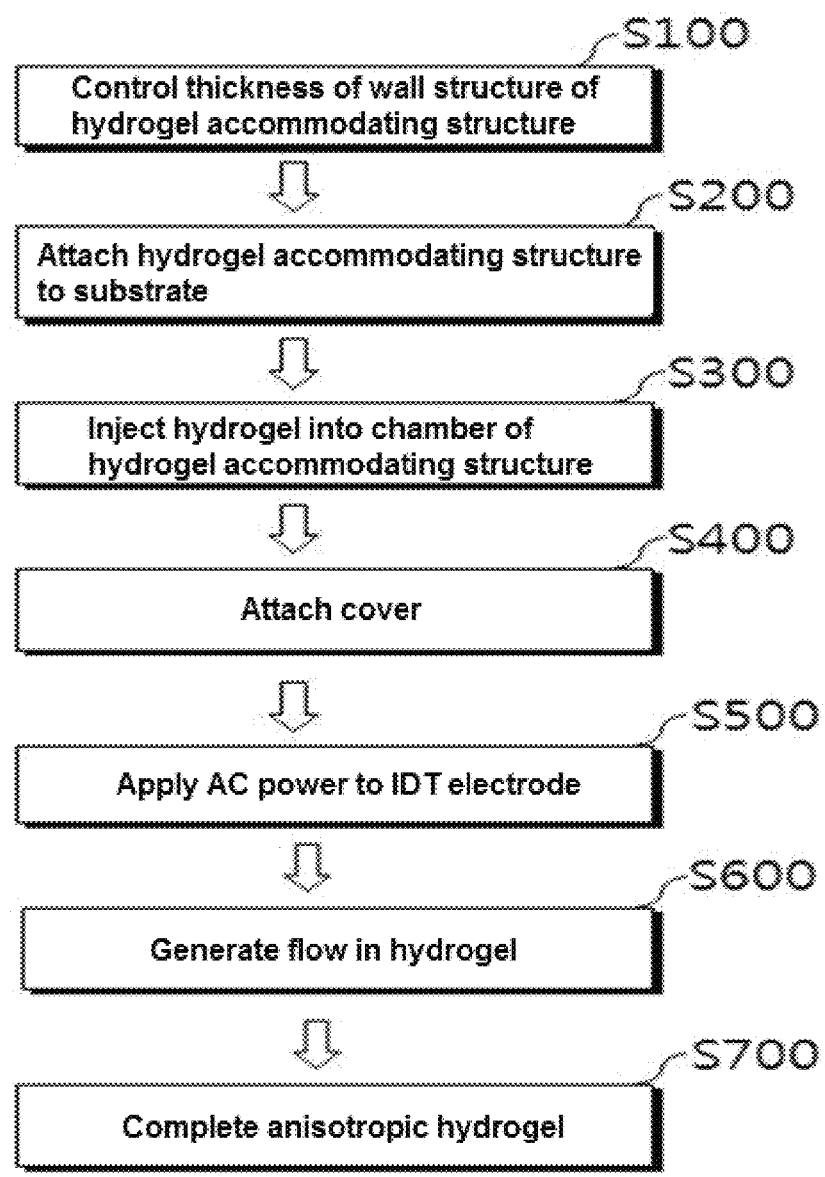
FIG. 9 is a flow chart illustrating a method of manufacturing a hydrogel.

A method of controlling a stiffness of a soft material using the apparatus of controlling a stiffness of a soft material according to another exemplary embodiment of the present invention may be easily derived from the method of controlling a stiffness of a soft material according to an exemplary embodiment of the present invention illustrated in FIG. 9. First, the coupling member 500 should be interposed between the hydrogel accommodating structure 200 and the substrate. In this process, which is a process of determining positions and ratios of the passing region 410 and the blocking region 420, the positions and the ratios of the passing region 410 and the blocking region 420 may be determined depending on to which portion of the hydrogel the stimulus is applied. In other words, the coupling member 500 is interposed in a portion corresponding to the passing region 410 to which the stimulus is intended to be transferred to set the passing region 410, and the blocking region 420 to which the stimulus is not transferred is set to a region corresponding to a region in which the coupling member 500 is not interposed. A material of the coupling member 500 is not particularly limited as long as it may transfer the stimulus by the surface acoustic wave, and may be a liquid or solid material. Particularly, in the case in which the coupling member 500 is formed of the liquid material, the apparatus of controlling a stiffness of a soft material may further include a wall structure surrounding the coupling member 500 in order to accommodate the coupling member 500 therein.

When the coupling member 500 is interposed, the coupling member 500 is covered with the second cover 320, the hydrogel accommodating structure 200 is attached to the first cover 310, the hydrogel material is injected into the chamber 210 of the hydrogel accommodating structure 200, and the first cover 310 is attached to the chamber 210 so that the chamber 210 may be sealed.

In addition, when AC power is applied to the IDT electrode 120, the surface acoustic wave is generated through the substrate 110. The surface acoustic wave is transferred to the hydrogel 400 through the coupling member 500, and mechanically stimulates the hydrogel 400 to generate a flow in the hydrogel 400, and when the flow of the hydrogel 400 is continued for a predetermined time, anisotropic hydrogel 400 of which a stiffness is partially changed depending on a flow level is completed.

Figure 13:
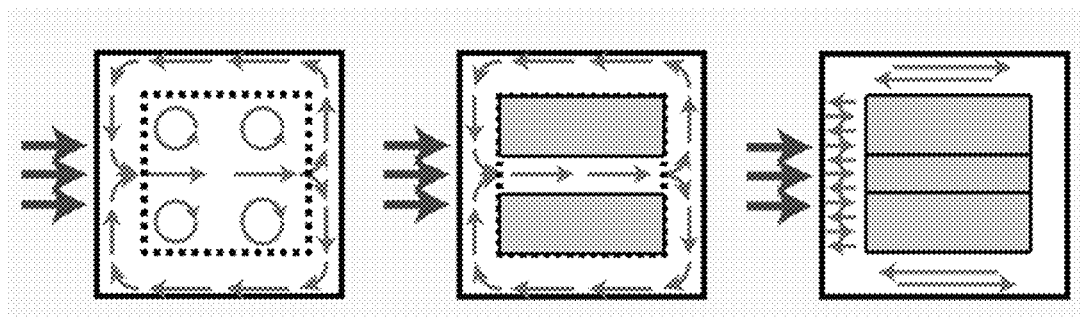
FIG. 13 is a conceptual diagram illustrating a process in which a hydrogel is hardened with the passage of time.

FIG. 13 is a conceptual diagram illustrating a process in which the hydrogel 400 is hardened with the passage of time when the stiffness of the hydrogel 400 is controlled using the apparatus of controlling a stiffness of a soft material according to the present invention. It may be appreciated from FIG. 13 that a vortex is generated between a main flow and a back flow and the hydrogel 400 is most rapidly hardened in a vortex region with the passage of time.

Although a case of controlling the stiffness of the soft material using the apparatus of controlling a stiffness of a soft material according to the present invention has been described hereinabove, the soft material used herein may be a soft material with which micro particles or cells are mixed as well as a soft material itself. When a flow is simply applied to the soft material with which the micro particles or cells are mixed as described above, a density of the micro particles or cells per unit volume (number/ml) is changed and distributed depending on the flow. In this case, differentiation levels of the cells are changed depending on a stiffness of the surrounding soft material.

Figure 14:
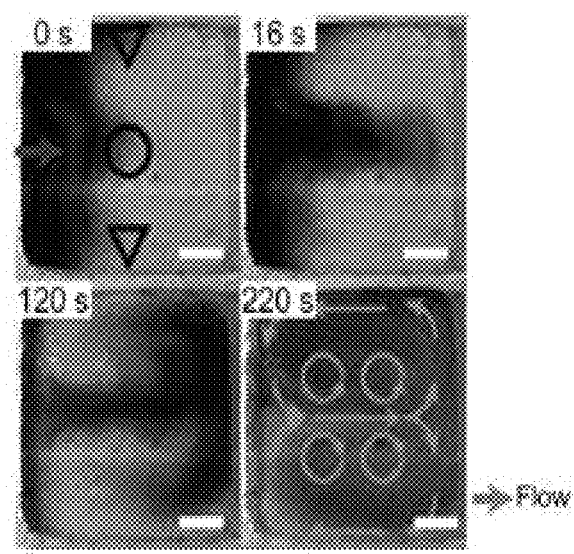
FIG. 14 is photographs illustrating flow states in the hydrogel depending on times.
Figure 15:
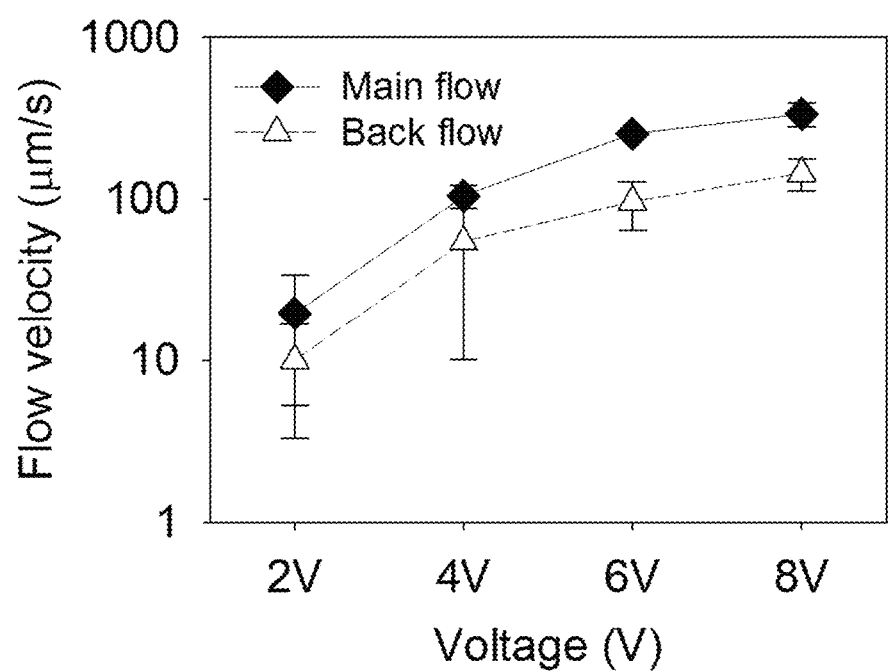
FIG. 15 is a graph illustrating a flow velocity depending on a voltage magnitude of alternating current (AC) power applied to an IDT electrode.

FIG. 14 is photographs illustrating states in which the surface acoustic wave is applied to the hydrogel 400 using the apparatuses of controlling a stiffness of a soft material according to an exemplary embodiment and another exemplary embodiment of the present invention described above, and FIG. 15 is a graph illustrating a flow velocity depending on a voltage of applied AC power. Portions represented by circle in FIG. 14 and lozenges in FIG. 15 indicate a region in which the main flow is generated by a direct influence of the surface acoustic wave, and portions represented by inverted triangles in FIG. 14 and triangles in FIG. 15 indicate a region to which a direct influence of the surface acoustic wave is not applied, that is, a region in which the back flow is generated.

In FIG. 14, a relatively dark portion is a region in which the flow is generated, and it may be appreciated that only the main flow is present at an early stage, but the back flow is formed with the passage of time. It may be confirmed from FIG. 15 that as the voltage of the AC power applied to the IDT electrode 120 becomes high, the flow velocity becomes rapid, and particularly, a magnitude difference of the main flow becomes large.

An internal structure of the soft material is changed using a means having an exciter means such as the surface acoustic wave, thereby making it possible to control the stiffness of the soft material. Further, a flow is selectively formed in the soft material to control the soft material to have different stiffnesses depending on regions, thereby making it possible to manufacture an anisotropic soft material. In addition, in the present invention, the flow generated in the soft material is used, thereby making it possible to overcome a limitation in an application depending on a material, which is a disadvantage of a method of changing an internal structure of the soft material according to the related art.

Although a case in which the apparatus and the method of controlling a stiffness of a soft material according to the present invention are applied to the hydrogel 400 has been described by way of example hereinabove, the apparatus and the method of controlling a stiffness of a soft material according to the present invention as described above are not limited to being applied to the hydrogel 400, but may be applied to a soft material including the hydrogel. In the present invention, various synthetic polymer materials and natural polymer materials may be used as the soft material, and a stiffness of a silicon rubber or a natural or synthetic polymer may also be controlled using the apparatus of controlling a stiffness of a soft material according to the present invention as long as it is a material hardened from a liquid state having viscosity into a solid state. Typically, polyacrylamide (PAAM), hyaluronic acid (HA) or hyaluronic acid catechol (HACA), polyethylene glycol (PEG), polyvinyl alcohol, polyethylene oxide, or the like, may be used as the synthetic polymer material, and collagen, polysaccharide (for example, chitosan, alginate, or agarose), or the like, may be used as the natural polymer material.

What is claimed is:

1. An apparatus of controlling a stiffness of a soft material hardened from a liquid state having viscosity into a solid state, comprising:
   a soft material accommodating means including a chamber corresponding to a space in which the soft material having fluidity before being hardened is accommodated and a wall structure surrounding the chamber; and
   a stimulus means configured to apply a stimulus to the soft material in the soft material accommodating means to generate a flow in the soft material,
   wherein the wall structure includes a passing region through which the stimulus generated in the stimulus means passes and a blocking region through which the stimulus generated in the stimulus means is blocked, and
   wherein a thickness of the wall structure in the passing region is relatively smaller than that of the wall structure in the blocking region.

2. An apparatus of controlling a stiffness of a soft material hardened from a liquid state having viscosity into a solid state, comprising:
   a soft material accommodating means including a chamber corresponding to a space in which the soft material having fluidity before being hardened is accommodated and a wall structure surrounding the chamber;
   a stimulus means configured to apply a stimulus to the soft material in the soft material accommodating means to generate a flow in the soft material; and
   a coupling member interposed between the soft material accommodating means and the stimulus means,
   wherein a width of the coupling member is smaller than that of the chamber, and
   wherein a passing region to which the stimulus generated in the stimulus means is transferred and a blocking region through which the stimulus generated in the stimulus means is blocked are formed in the chamber, the passing region being a region that corresponds to the coupling member and the blocking region being a region that does not correspond to the coupling member.

3. The apparatus of controlling a stiffness of a soft material of claim 1, wherein the stimulus means is a surface acoustic wave generator or an ultrasound transducer.

4. The apparatus of controlling a stiffness of a soft material of claim 1, wherein the stimulus means is a surface acoustic wave generator including a substrate and an inter digital transducer (IDT) electrode formed on the substrate.

5. The apparatus of controlling a stiffness of a soft material of claim 1, wherein the wall structure of the soft material accommodating means is formed of polydimethylsiloxane (PDMS).

6. The apparatus of controlling a stiffness of a soft material of claim 4, wherein the soft material accommodating means is attached to the substrate.

7. The apparatus of controlling a stiffness of a soft material of claim 4, wherein an interval between one IDT finger and another one adjacent IDT finger is constant.

8. An apparatus for controlling a stiffness of a soft material hardened from a liquid state having viscosity into a solid state, the apparatus comprising:
 a soft material accommodating chamber formed of a wall structure and having a space in which the soft material having fluidity before being hardened is accommodated; and
 a stimulus generator configured to apply a stimulus to the soft material in the soft material accommodating chamber to generate a flow in the soft material,
 wherein the wall structure includes a passing region through which the stimulus generated in the stimulus means passes and a blocking region through which the stimulus generated in the stimulus means is blocked, and
 wherein a thickness of the wall structure in the passing region is relatively smaller than that of the wall structure in the blocking region.

\* \* \* \* \*